US012800518B2

(12) United States Patent
Matsuda et al.

(10) Patent No.: US 12,800,518 B2
(45) Date of Patent: Nov. 17, 2026

(54) X-RAY IMAGING APPARATUS

(71) Applicant: SHIMADZU CORPORATION, Kyoto (JP)

(72) Inventors: Kazuyuki Matsuda, Kyoto (JP); Ryusuke Watanabe, Kyoto (JP); Fumiaki Tanaka, Kyoto (JP); Koki Yoshida, Kyoto (JP)

(73) Assignee: SHIMADZU CORPORATION, Nishinokyo Kuwabara (JP)

( * ) Notice: Subject to any disclaimer, the term of this patent is extended or adjusted under 35 U.S.C. 154(b) by 84 days.

(21) Appl. No.: 19/106,092

(22) PCT Filed: Jun. 15, 2023

(86) PCT No.: PCT/JP2023/022178
§ 371 (c)(1),
(2) Date: Feb. 24, 2025

(87) PCT Pub. No.: WO2024/042823
PCT Pub. Date: Feb. 29, 2024

(65) Prior Publication Data

US 2025/0389675 A1 Dec. 25, 2025

(30) Foreign Application Priority Data

Aug. 23, 2022 (JP) ................................ 2022-132650

(51) Int. Cl.
*G01N 23/04* (2018.01)

(52) U.S. Cl.
CPC ..... *G01N 23/04* (2013.01); *G01N 2223/1016* (2013.01); *G01N 2223/306* (2013.01); *G01N 2223/308* (2013.01); *G01N 2223/321* (2013.01)

(58) Field of Classification Search
CPC ........... G01N 23/04; G01N 2223/1016; G01N 2223/306; G01N 2223/308; G01N 2223/321
See application file for complete search history.

(56) References Cited

U.S. PATENT DOCUMENTS 7,130,378 B2 * 10/2006 Akutsu .................... A61B 6/10
378/92
2013/0028388 A1 1/2013 Yoshida et al.
2022/0233158 A1 7/2022 Yoshida et al.

FOREIGN PATENT DOCUMENTS

JP 62-066598 A 3/1987
JP 11-285492 A 10/1999
(Continued)

OTHER PUBLICATIONS

Written Opinion by the International Searching Authority dated Aug. 29, 2023, for international application No. PCT/JP2023/022178.
(Continued)

*Primary Examiner* — Uzma Alam
*Assistant Examiner* — Fani Polyzos Boosalis
(74) *Attorney, Agent, or Firm* — Muir Patent Law, PLLC

(57) ABSTRACT

An X-ray X-ray imaging apparatus (100) according to this invention includes a first arm (1); a second arm (2); an imaging angle specifier (4) for setting a target imaging angle(s) of a first X-ray source (1*a*) and a target imaging angle(s) of a second X-ray source (2*a*); and a display (3), wherein the display (3) is configured to display an arrangement screen (8) representing arrangements corresponding to positions of both the first X-ray source (1*a*) and the second X-ray source (2*a*) at the target imaging angles with respect to an actual position of a subject (101), and the imaging angle specifier (4) and the display (3) are arranged in a
(Continued)

common arrangement area (103) of an X-ray imaging apparatus main body (100*a*).

12 Claims, 6 Drawing Sheets

(56) References Cited

FOREIGN PATENT DOCUMENTS

| | | | | | |
|---|---|---|---|---|---|
| JP | 2001-204720 | A | | 7/2001 | |
| JP | 5510540 | B2 | * | 6/2014 | ............. A61B 6/467 |
| JP | 2022-055170 | A | | 4/2022 | |
| JP | 2022112767 | A | * | 8/2022 | ........... A61B 6/4441 |

OTHER PUBLICATIONS

Notice of Reasons for Refusal dated Jul. 22, 2025 for corresponding Japanese Patent Application No. 2024-542602.

* cited by examiner

<X-RAY SOURCE ARRANGEMENT INFORMATION>

| SETTING INFORMATION | FIRST X-RAY SOURCE (FRONTAL ARM) | SECOND X-RAY SOURCE (LATERAL ARM) |
|---|---|---|
| | LAO/RAO, CRAN/CAUD | LAO/RAO, CRAN/CAUD |
| 1 | RAO 30°, CRAN 30° (MAIN) | LAO 45°, CAUD 30° |
| 2 | RAO 30°, 0° (MAIN) | LAO 45°, 0° |
| 3 | RAO 30°, CAUD 30° (MAIN) | LAO 40°, CRAN 20° |
| 4 | 0°, CRAN 30° (MAIN) | LAO 90°, 0° |
| 5 | 0°, 0° (MAIN) | LAO 90°, 0° |
| 6 | 0°, CAUD 30° (MAIN) | LAO 90°, 0° |
| 7 | RAO 20°, CRAN 20° | LAO 45°, CRAN 25° (MAIN) |
| 8 | RAO 20°, 0° | LAO 60°, 0° (MAIN) |
| 9 | RAO 20°, CAUD 20° | LAO 50°, CAUD 30° (MAIN) |

X-RAY IMAGING APPARATUS

TECHNICAL FIELD

The present invention relates to an X-ray imaging apparatus, and in particular to an X-ray imaging apparatus including two arms.

BACKGROUND ART

X-ray imaging apparatuses including two arms are known in the art. Such an X-ray imaging apparatus is disclosed in Japanese Patent Publication No. JP 5510540, for example.

The X-ray imaging apparatus described in the above Japanese Patent Publication No. JP 5510540 includes two arms, which are a C-shaped arm supporting an X-ray source and an X-ray detector facing each other in a top-to-bottom direction, and an Ω-shaped arm supporting an X-ray source and an X-ray detector facing each other in a right-to-left direction. The X-ray imaging apparatus further includes an operating panel for receiving operating inputs for moving the two arms, and a display panel for displaying target imaging angles indicating a target imaging position set through the operation panel and to which the two arms are moved. The aforementioned operation panel is provided to a bed for a subject.

PRIOR ART

Patent Document

Patent Document 1: Japanese Patent Publication No. JP 5510540

SUMMARY OF THE INVENTION

Problems to be Solved by the Invention

Here, although the position of the display panel is not clearly stated in the above Japanese Patent Publication No. JP 5510540, the display panel is generally arranged at a position away from the operation panel on an upper side of the subject. Since operators necessarily move their lines of sight to the operation pane during monitoring of the display panel at hand when moving the two arms in a case in which such an arrangement is applied to the above Japanese Patent Publication No. JP 5510540, they desire improvement. Although not clearly stated in the above Japanese Patent Publication No. JP 5510540, the display panel generally indicates target imaging angles only in numeric form. In a case in which such a configuration is applied to the above Japanese Patent Publication No. JP 5510540, operators necessarily grasp positions of the two arms (X-ray sources) with respect to the subject from numerical values indicating the target imaging angles. In this case, since the operators cannot intuitively operate the X-ray imaging apparatus disclosed in the above Japanese Patent Publication No. JP 5510540 to move the X-ray sources, they desire its improvement.

The present invention is intended to solve the above problems, and one object of the present invention is to provide an X-ray imaging apparatus allowing operators to operate the X-ray imaging apparatus to move X-ray sources without moving their lines of sight and to intuitively operate the X-ray imaging apparatus to move the X-ray sources.

Means for Solving the Problems

In order to attain the aforementioned object, an X-ray imaging apparatus according to one aspect of the present invention includes a first arm supporting a first X-ray source and a first X-ray detector facing each other; a second arm supporting a second X-ray source and a second X-ray detector facing each other; an imaging angle specifier for setting a target imaging angle(s) of the first X-ray source and a target imaging angle(s) of the second X-ray source; and a display for displaying details set by the imaging angle specifier, wherein the display is configured to display an arrangement screen representing arrangements corresponding to positions of both the first X-ray source and the second X-ray source at the target imaging angle with respect to an actual position of a subject, and the imaging angle specifier and the display are arranged in a common arrangement area of an X-ray imaging apparatus main body.

Effect of the Invention

According to the X-ray imaging apparatus according to the one aspect of the present invention, a display is configured to display an arrangement screen representing arrangements corresponding to positions of both a first X-ray source and a second X-ray source at the target imaging angles with respect to an actual position of a subject. Accordingly, operators can understand the positions of both the first X-ray source and the second X-ray source with respect to the subject based on an image like a map allowing the operators to visually confirm the positions on the arrangement screen. Also, an imaging angle specifier and a display are arranged in a common arrangement area of an X-ray imaging apparatus main body. Accordingly, the operators can confirm both the imaging angle specifier and the display without moving their lines of sight. Consequently, the operators can operate the X-ray imaging apparatus to move the first X-ray source and the second X-ray source without moving their lines of sight and can intuitively operate the X-ray imaging apparatus to move the first X-ray source and the second X-ray source.

MODES FOR CARRYING OUT THE INVENTION

Embodiments embodying the present invention will be described with reference to the drawings.

Entire Configuration of X-Ray Imaging Apparatus

An X-ray imaging apparatus 100 according to one embodiment of the present invention is now described with reference to FIGS. 1 to 9.

Figure 1:
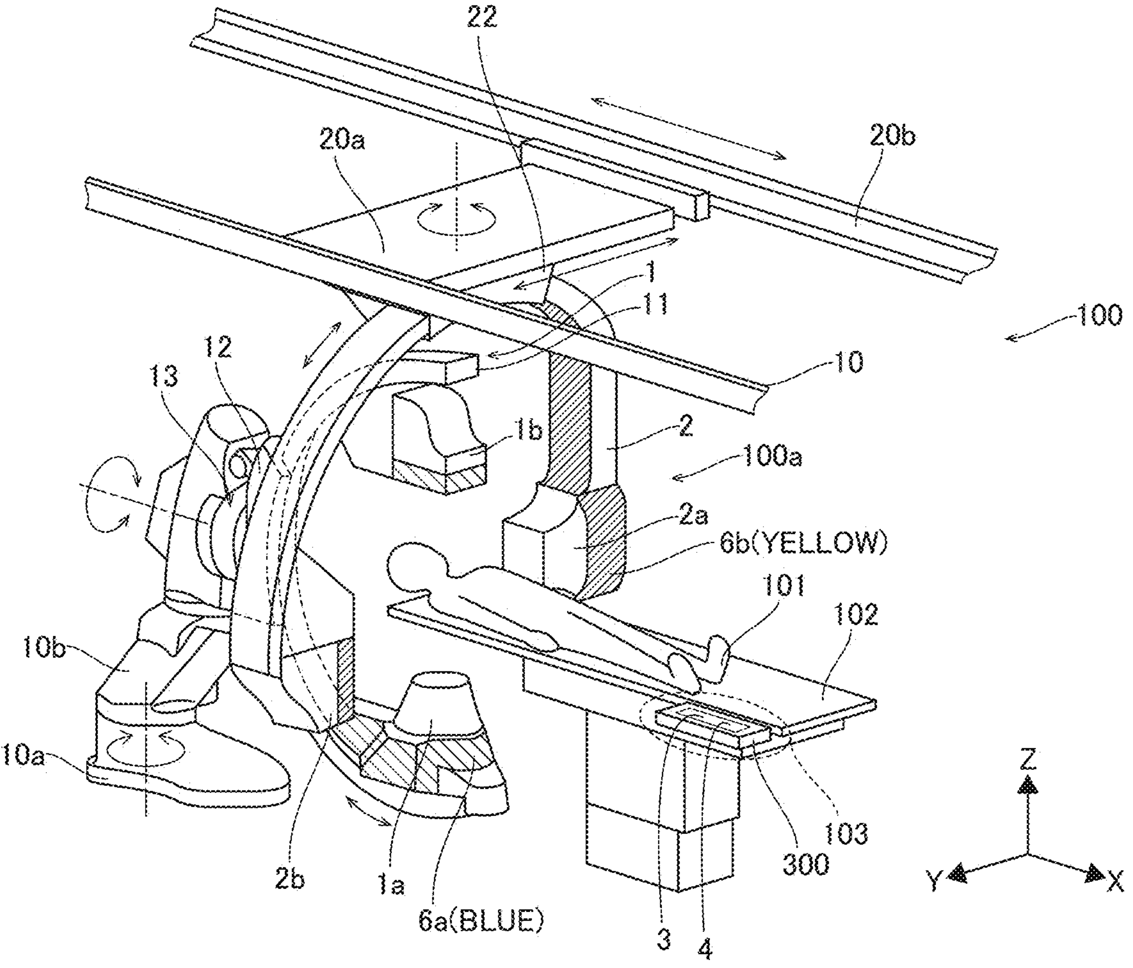
FIG. 1 is a perspective view illustrating a configuration of an X-ray imaging apparatus according to an embodiment.
Figure 2:
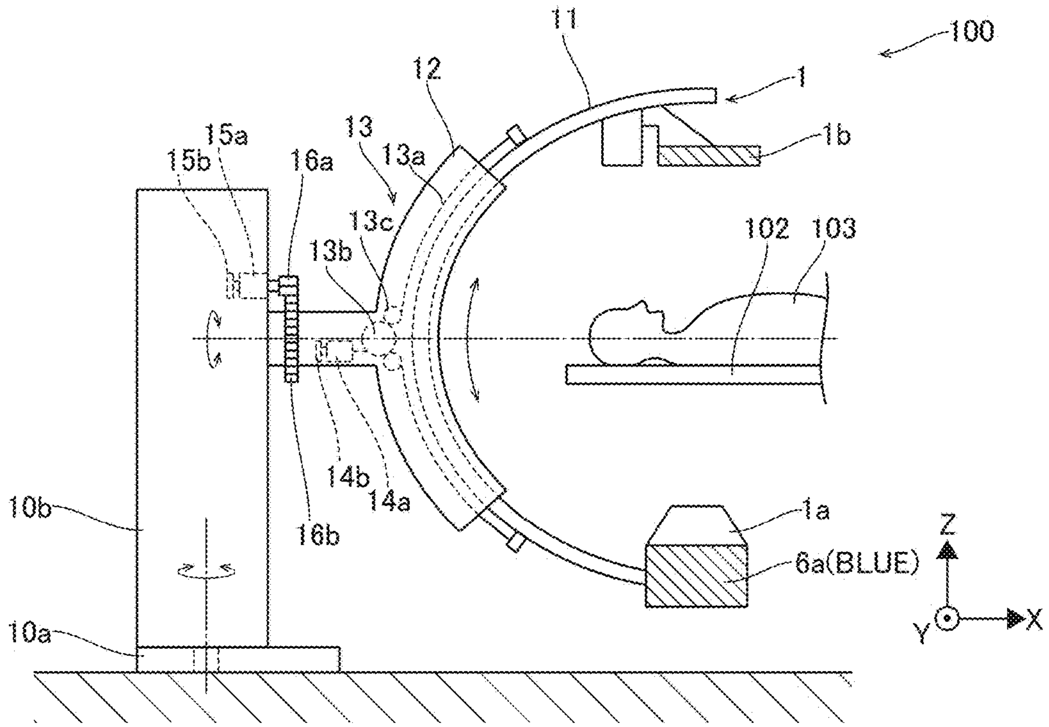
FIG. 2 is a side view illustrating the configuration of the X-ray imaging apparatus according to the embodiment.
Figure 3:
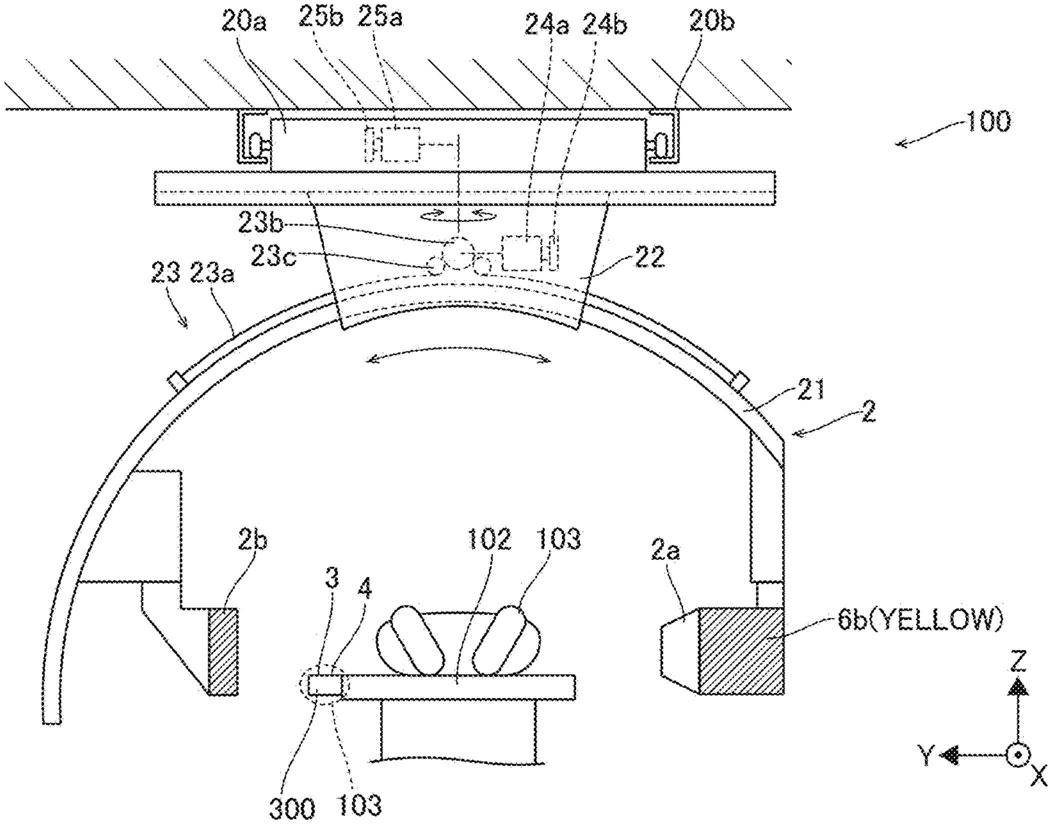
FIG. 3 is a front view illustrating the configuration of the X-ray imaging apparatus according to the embodiment.

As shown in FIG. 1, the X-ray imaging apparatus 100 is used for X-ray imaging to confirm morphology of blood vessels and flows of blood in a body of a subject 101, for example. The X-ray imaging apparatus 100 according to this embodiment is a so-called biplane X-ray imaging apparatus including two arms, which are first arm 1 and a second arm 2. The biplane X-ray imaging apparatus 100 can simultaneously emit X-rays in two directions to generate two X-ray images. The first arm 1 is configured as a so-called frontal arm, which is mainly used for imaging from a body-axis-directional side and an upward/downward-directional side of the subject 101. The second arm 2 is configured as a so-called lateral arm, which is mainly used for imaging from a lateral side of the subject 101.

Here, an upward/downward direction is indicated as a Z direction; a body axis direction (body-axis extension direction) of the subject 101 who lies in a supine position is indicated as an X direction; and a rightward/leftward directions of the subject 101, which is a horizontal direction perpendicular to the X direction, is indicated as a Y direction in each figure.

As shown in FIGS. 1 to 4, the X-ray imaging apparatus 100 includes a first X-ray source 1*a* and a first X-ray detector 1*b*; a first arm 1 supporting the first X-ray source 1*a* and the first X-ray detector 1*b* facing each other; a second X-ray source 2*a* and a second X-ray detector 2*b*; a second arm 2 supporting the second X-ray source 2*a* and the second X-ray detector 2*b*; a CPU 200; a display 3; an imaging angle specifier 4; a storage 5*a*; and a controller 5.

The display 3, the imaging angle specifier 4, the storage 5*a*, and the controller 5 are integrally configured as a touch panel 300. Here, the touch panel 300 is removably installed on a bed 102 side of the subject 101. In other words, the display 3 and the imaging angle specifier 4 are arranged in a common arrangement area 103 of an X-ray imaging apparatus main body 100*a*. Accordingly, operators can see the display 3 while visually confirming and operating the imaging angle specifier 4 at one time. Consequently, operators do not necessarily move their lines of sight when seeing both the imaging angle specifier 4 and the display 3.

Configurations of First X-Ray Source, First X-Ray Detector and First Arm

The first X-ray source 1*a* is an X-ray irradiator including an X-ray tube for irradiating the subject with X-rays when a voltage is applied. The first X-ray source 1*a* irradiates the subject 101 who lies in the supine position on the bed 102 with X-rays. The first X-ray source 1*a* mainly emits X-rays toward the subject 101 from the body-axis-directional side and the upward/downward-directional side of the subject 101.

The first X-ray detector 1*b* detects X-rays passing through the subject 101. The first X-ray detector 1*b* then outputs detection signals based on the detected X-rays. Although not limited, one example is that the first X-ray detector 1*b* includes a flat panel detector (FPD). Also, although not limited, one example is that the first X-ray detector 1*b* is configured as a wireless type X-ray detector and outputs detection signals as wireless signals to an X-ray image generator (not shown) through wireless LAN or the like. The X-ray image generator generates X-ray images based on the detection signals. The X-ray image generated is output to a display apparatus (not shown) so that operators can see the X-ray image.

The first arm 1, which is configured as the so-called frontal arm, includes a base 10*a* arranged on a floor, and a support pillar 10*b* arranged on the base 10*a*. The first arm 1 is supported by the support pillar 10*b* and installed on the floor through the base 10*a*. The support pillar 10*b* is mounted to the base 10*a* rotatably about a vertical axis.

The first arm 1 includes a C-shaped arm 11 having an arc-shaped (C-shaped) as viewed in the rightward/leftward direction (Y direction), and an arm holder 12 for supporting the C-shaped arm 11 movably in an arc direction. The C-shaped arm 11 has one end supporting the first X-ray source 1*a* and another end supporting the first X-ray detector 1*b* so that the first X-ray source 1*a* and the first X-ray detector 1*b* face each other to interpose the subject 101 between them.

The first arm 1 includes a rotation mechanism 13 and a drive motor 14*a* for rotating the C-shaped arm 11 with respect to the arm holder 12 in the arc direction about a rightward/leftward-directional axis (an axis perpendicular to the body axis in a horizontal plane), and a rotary encoder 14*b* for detecting a rotation angle of the drive motor 14*a*. A detection value of the rotary encoder 14*b* is output to the CPU 200.

The rotation mechanism 13 is accommodated in the arm holder 12. The rotation mechanism 13 includes a belt 13*a* attached to the C-shaped arm 11, a drive roller 13*b* around which the belt 13*a* is wound and to which torque is applied by the drive motor 14*a*, and a guide roller 13*c* guiding the belt 13*a* to the drive roller 13*b*.

Also, the first arm 1 includes a drive motor 15*a* for rotating the arm holder 12 with respect to the support pillar 10*b* about the body axis, and a rotary encoder 15*b* for detecting a rotation angle of the drive motor 15*a*. The drive motor 15*a* rotates a pinion gear 16*a* to rotate the arm holder 12 through a gear 16*b*, which is rotated through the pinion gear 16*a*. A detection value of the rotary encoder 15*b* is output to the CPU 200.

The first arm 1 is colored in a first exterior color 6*a* (a color of parts shown by a loose hatching pattern in FIG. 1). An inner surface of the first arm 1 is colored in blue as the first exterior color 6*a* in a particular example. Also, the first X-ray source 1*a* and the first X-ray detector 1*b* are colored in blue as the first exterior color 6*a* same as the first arm 1. Here, not only in FIG. 1 but also in other figures, the color of the parts shown by the loose hatching patter similar to FIG. 1 represents the same color as the first exterior color 6*a*.

Compositions of Second X-Ray Source, Second X-Ray Detector and Second Arm

The second X-ray source 2*a* and the second X-ray detector 2*b* have the same configurations as the first X-ray source 1*a* and the first X-ray detector 1*b* described above, receptively, and their description is omitted. Here, the second X-ray source 2*a* is mainly arranged on a left side of the subject 101 who lies in the supine position.

The second arm 2, which is configured as the so-called lateral arm, includes a base 20*a* arranged on a ceiling surface. The second arm 2 is supported by the base 20*a*. The base 20*a* is supported by guide rails 20*b* extending in the body axis direction and the rightward/leftward direction, and is configured to move in horizontal directions together with the second arm 2.

The second arm 2 includes a C-shaped arm 21 having an arc-shaped (C-shaped) as viewed in the body axis direction, and an arm holder 22 for supporting the C-shaped arm 21 movably in an arc direction. The C-shaped arm 21 has one end supporting the second X-ray source 2*a* and another end supporting the second X-ray detector 2*b* so that the second X-ray source 2*a* and the second X-ray detector 2*b* face each other to interpose the subject 101 between them.

The second arm 2 includes a rotation mechanism 23 and a drive motor 24*a* for rotating the C-shaped arm 21 with respect to the arm holder 22 in the arc direction about the body axis, and a rotary encoder 24*b* for detecting a rotation angle of the drive motor 24*a*. A detection value of the rotary encoder 24*b* is output to the CPU 200.

The rotation mechanism 23 is accommodated in the arm holder 22. The rotation mechanism 23 includes a belt 23*a* attached to the C-shaped arm 21, a drive roller 23*b* around which the belt 23*a* is wound and to which torque is applied by the drive motor 24*a*, and a guide roller 23*c* guiding the belt 23*a* to the drive roller 23*b*.

Also, the second arm 2 includes a rotation mechanism (not shown) and a drive motor 25*a* for rotating the arm holder 22 with respect to the base 20*a* about a vertical axis; and a rotary encoder 25*b* for detecting a rotation angle of the drive motor 25*a*. A detection value of the rotary encoder 25*b* is output to the CPU 200.

The second arm 2 is colored in a second exterior color 6*b* (a color of parts shown by a tight hatching pattern in FIG. 1) different from the first exterior color 6*a*. An inner surface of the second arm 2 is colored in yellow as the second exterior color 6*b* in a particular example. Also, the second X-ray source 2*a* and the second X-ray detector 2*b* are colored in yellow as the second exterior color 6*b* same as the second arm 2. Here, not only in FIG. 1 but also in other figures, the color of the parts shown by the tight hatching patter similar to FIG. 1 represents the same color as the second exterior color 6*b*.

Configuration of CPU

The CPU 200 is configured to execute control for driving the first arm 1 so as to arrange the first X-ray source 1*a* at target imaging angles by controlling driving of the drive motors 14*a*, 15*a* and the like based on target imaging angle signals output from the touch panel 300 (controller 5) while acquiring the detection values of the rotary encoders 14*b*, 15*b* and the like. Also, the CPU 200 is configured to execute control for driving the second arm 2 so as to arrange the second X-ray source 2*a* at target imaging angles by controlling driving of the drive motors 24*a*, 25*a* and the like based on target imaging angle signals output from the touch panel 300 (controller 5) while acquiring the detection values of the rotary encoders 24*b*, 25*b* and the like.

Composition of Display and Imaging Angle Specifier

The display 3 includes a touch-operable display. Although not limited, one example is that the display 3 is a liquid crystal display. The display 3 is configured to indicate details set through the imaging angle specifier 4. The imaging angle specifier 4 is an operating part for setting the target imaging angles of the first X-ray sources 1*a* and the second X-ray sources 2*a*. Specifically, the imaging angle specifier 4 is various operating switches to be used to set the target imaging angles of the first X-ray sources 1*a* and the second X-ray sources 2*a* on the display 3 (touch panel 300).

The display 3 is configured to display a screen for receiving input operations of the X-ray imaging apparatus 100 input by operators. Specifically, the display 3 is configured to be able to display two images, which are a pre-arrangement setting screen (direct memory setting screen) 7 and an arrangement screen 8 based on information that is set in the pre-arrangement setting screen 7. The arrangement screen 8 is an operation setting screen used to arrange the first X-ray source 1*a* and the second X-ray source 2*a* at predetermined positions during actual imaging. The pre-arrangement setting screen 7 is an operation setting screen (screen for direct memory) for storing information necessary to display the arrangement screen 8 on the display 3 into the storage 5*a* in advance.

Pre-Arrangement Setting Screen

The pre-arrangement setting screen 7 is a screen for setting association of the arrangements of the first X-ray source 1*a* and the second X-ray source 2*a* with each other and for setting the target imaging angles of the first X-ray sources 1*a* and the second X-ray sources 2*a*. X-ray source arrangement information, which associate these arrangements of the first X-ray source 1*a* and the second X-ray source 2*a* with each other, is stored in the storage 5*a*.

Although not limited, one example is that details indicated on the pre-arrangement setting screen 7 include the current imaging angles of the first X-ray sources 1*a* and the second X-ray sources 2*a*, and the current arrangements of the first X-ray sources 1*a* and the second X-ray sources 2*a* with respect to the subject 101 in a plan view as the current imaging angle information in an upper part of the screen.

Figures 5, 6:
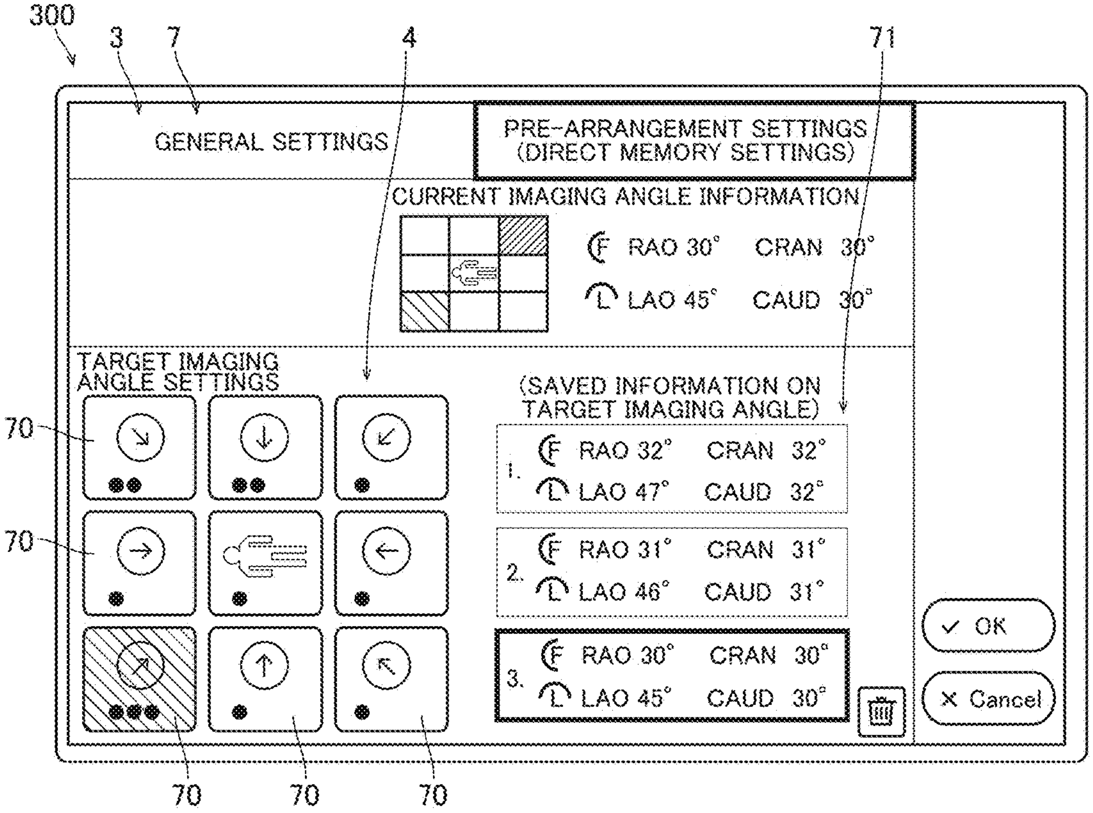
FIG. 5 is a view showing a pre-arrangement setting screen of a touch panel of the X-ray imaging apparatus according to the embodiment.
FIG. 6 is a view showing X-ray source arrangement information (information representing relations between target imaging angles of a first X-ray source and target imaging angles of a second X-ray source) stored in a storage of the X-ray imaging apparatus according to the embodiment.

Here, in the current imaging angle information indicated on the pre-arrangement setting screen 7 shown in FIG. 5, a cell in a lower-left part of the screen is displayed in the same blue color as the first exterior color 6*a* in a matrix of 3×3 cells so that operators can understand that the first X-ray source 1*a* is arranged on a right side and a cranial side of the subject 101. Also, a cell in an upper-right side of the screen is displayed in the same yellow color as the second exterior color 6*b* cells so that operators can understand that the second X-ray source 2*a* is arranged on a left side and a caudal side of the subject 101.

In addition, details indicated on the pre-arrangement setting screen 7 include 3×3 (totally nine) imaging angle setting switches 70 as setting information on the target imaging angles in a lower part of the screen. The 3×3 imaging angle setting switches 70 indicate the arrangements of the first X-ray sources 1*a* and the second X-ray sources 2*a* with respect to the subject 101 in the plan view similar to the matrix of 3×3 cells as the aforementioned current imaging angle information. The imaging angle setting switch 70 that is highlighted in the lower-left part (the right side and the cranial side of the subject 101) of the screen in the nine switches is a switch that is selected by a user as a main X-ray source. Since the first X-ray source 1*a* is currently arranged a cell in the lower-left part of the screen (on the right side and the cranial side of the subject 101), the screen shown in FIG. 5 corresponds to a screen for setting the target imaging angle of the first X-ray source 1*a*.

In this screen, the operator can enter settings of three combinations of the target imaging angles of the first X-ray sources 1*a* and the second X-ray sources 2*a* at the maximum. Here, since three solid circles are indicated in a frame of the imaging angle setting switch 70 in the lower-left part of the screen, the operator can understand that three combinations of the target imaging angles of the first X-ray sources 1*a* and the second X-ray sources 2*a* have been currently entered as previously entered information.

The three combinations 71 of the target imaging angles, which have been entered as currently entered information, are indicated on a right side of the 3×3 imaging angle setting switches 70. In the screen shown in FIG. 5, a third combination of the target imaging angles of the first X-ray sources 1*a* and the second X-ray sources 2*a* is highlighted, which means that the target imaging angles of the first X-ray source 1*a* (frontal arm) as a main X-ray source are set to RAO 30 degrees and CRAN 30 degrees, and the target imaging angles of the second X-ray source 2*a* as a sub X-ray source (frontal arm) are set to LAO 45 degrees and CAUD 30 degrees. In this screen, the settings are saved by pressing an OK switch in a lower-right part of the screen.

The aforementioned RAO means right anterior oblique. The aforementioned LAO means left anterior oblique. The aforementioned CRAN is an abbreviation for CRANIAL, and means cranial oblique. The aforementioned CAUD is an abbreviation for CAUDAL, and means caudal oblique.

Here, the second X-ray source 2*a* is currently arranged in the upper-right part of the screen (on the left side and the caudal side of the subject 101), which means that the second X-ray source 2*a* is turned into the main X-ray source and the first X-ray source 1*a* is turned into the sub X-ray source by pressing an upper-right switch in the 3×3 imaging angle setting switches 70. This pressing moves the highlighted part from the lower-left switch to an upper-right switch in the 3×3 imaging angle setting switches 70.

The aforementioned "main X-ray source" is the X-ray source that is to be moved during actual imaging to the arrangement of the X-ray source arrangement switch (memory switch) 80 (80*a* to 80*i*) (see FIGS. 7 and 8) that is selected (pressed) by the user on the arrangement screen 8. The aforementioned "sub X-ray source" is the X-ray source the arrangement of which is automatically selected in a case in which the arrangement of the main X-ray source is selected by the user. For this reason, the arrangement of the sub X-ray source is necessarily entered to associate with the arrangement of the main X-ray source in advance on the pre-arrangement setting screen 7. The "main X-ray source" and the "sub X-ray source" can be the first X-ray source 1*a* and the second X-ray source 2*a*, respectively, or the second X-ray source and the first X-ray source, respectively. The X-ray source arrangement switches 80 are examples of "X-ray source arrangement sections" in the claims.

The pre-arrangement setting is completed by setting such combinations of the target imaging angles of the first X-ray sources 1*a* and the second X-ray sources 2*a* for each of the nine imaging angle setting switches 70. Here, the pre-arrangement setting is not required for the imaging angle setting switches 70 that are not used during imaging.

A particular example of the X-ray source arrangement information stored in the storage 5*a* as a result of the pre-arrangement setting is described with reference to FIG. 6.

The storage 5*a* stores first setting information on an arrangement in which the second X-ray source 2*a* (sub X-ray source) is arranged at the target imaging angles of LAO 45 degrees and CAUD 30 degrees (on the left side and the caudal side of the subject 101) when the first X-ray source 1*a* (main X-ray source) is arranged at the target imaging angles of RAO 30 degrees and CRAN 30 degrees (on the right side and the cranial side of the subject 101). Here, this stored first setting information is realized by selecting the X-ray source arrangement switch 80*a* (the switch at a position corresponding to the arrangement of the first X-ray source 1*a*, which will serve as the main X-ray source) on the arrangement screen 8 during actual imaging by the operator.

Also, the storage 5*a* stores second setting information on an arrangement in which the second X-ray source 2*a* is arranged at the target imaging angles of LAO 45 degrees and CRAN/CAUD 0 degree (on the left side of the subject 101) when the first X-ray source 1*a* is arranged at the target imaging angles of RAO 30 degrees and CRAN/CAUD 0 degree (on the right side of the subject 101). Here, this stored second setting information is realized by selecting the X-ray source arrangement switch 80*b* (the switch at a position corresponding to the arrangement of the first X-ray source 1*a*, which will serve as the main X-ray source) on the arrangement screen 8 during actual imaging by the operator.

Also, the storage 5*a* stores third setting information on an arrangement in which the second X-ray source 2*a* is arranged at the target imaging angles of LAO 40 degrees and CRAN 20 degrees (on the left side and the cranial side of the subject 101) when the first X-ray source 1*a* is arranged at the target imaging angles of RAO 30 degrees and CAUD 30 degrees (on the right side and the caudal side of the subject 101). Here, this stored third setting information is realized by selecting the X-ray source arrangement switch 80*c* (the switch at a position corresponding to the arrangement of the first X-ray source 1*a*, which will serve as the main X-ray source) on the arrangement screen 8 during actual imaging by the operator.

Also, the storage 5*a* stores fourth setting information on an arrangement in which the second X-ray source 2*a* is arranged at the target imaging angles of LAO 90 degrees and CRAN/CAUD 0 degree (on the cranial side of the subject 101) when the first X-ray source 1*a* is arranged at the target imaging angles of LAO/RAO 0 degree and CRAN 30 degrees (on the cranial side of the subject 101). Here, this stored fourth setting information is realized by selecting the X-ray source arrangement switch 80*d* (the switch at a position corresponding to the arrangement of the first X-ray source 1*a*, which will serve as the main X-ray source) on the arrangement screen 8 during actual imaging by the operator.

Also, the storage 5*a* stores fifth setting information on an arrangement in which the second X-ray source 2*a* is arranged at the target imaging angles of LAO 90 degrees and CRAN/CAUD 0 degree (on the left side of the subject 101) when the first X-ray source 1*a* is arranged at the target imaging angles of LAO/RAO 0 degree and CRAN/CAUD 0 degree (on a front side or a back side of the subject 101). Here, this stored fifth setting information is realized by selecting the X-ray source arrangement switch 80*e* (the switch at a position corresponding to the arrangement of the first X-ray source 1*a*, which will serve as the main X-ray source) on the arrangement screen 8 during actual imaging by the operator.

Also, the storage 5*a* stores sixth setting information on an arrangement in which the second X-ray source 2*a* is arranged at the target imaging angles of LAO 90 degrees and CRAN/CAUD 0 degree (on the cranial side of the subject 101) when the first X-ray source 1*a* is arranged at the target imaging angles of LAO/RAO 0 degree and CAUD 30 degrees (on the caudal side of the subject 101). Here, this stored sixth setting information is realized by selecting the X-ray source arrangement switch 80*f* (the switch at a position corresponding to the arrangement of the first X-ray source 1*a*, which will serve as the main X-ray source) on the arrangement screen 8 during actual imaging by the operator.

Also, the storage 5*a* stores seventh setting information on an arrangement in which the second X-ray source 2*a* is arranged at the target imaging angles of RAO 20 degrees and CRAN 20 degrees (on the right side and the cranial side of the subject 101) when the first X-ray source 1*a* is arranged at the target imaging angles of LAO 45 degrees and CRAN 25 degrees (on the left side and the cranial side of the subject 101). Here, this stored seventh setting information is realized by selecting the X-ray source arrangement switch 80*g* (the switch at a position corresponding to the arrangement of the second X-ray source 2*a*, which will serve as the main X-ray source) on the arrangement screen 8 during actual imaging by the operator.

Also, the storage 5*a* stores eighth setting information on an arrangement in which the first X-ray source 1*a* is arranged at the target imaging angles of RAO 20 degrees and CRAN/CAUD 0 degree (on the right side and the caudal side of the subject 101) when the second X-ray source 2*a* is arranged at the target imaging angles of LAO 60 degrees and CRAN/CAUD 0 degree (on the left side of the subject 101). Here, this stored eighth setting information is realized by selecting the X-ray source arrangement switch 80*h* (the switch at a position corresponding to the arrangement of the second X-ray source 2*a*, which will serve as the main X-ray source) on the arrangement screen 8 during actual imaging by the operator.

Also, the storage 5*a* stores ninth setting information on an arrangement in which the first X-ray source 1*a* is arranged at the target imaging angles of RAO 20 degrees and CAUD 20 degrees (on the right side and the caudal side of the subject 101) when the second X-ray source 2*a* is arranged at the target imaging angles of LAO 50 degrees and CAUD 30 degree (on the left side and the caudal side of the subject 101). Here, this stored ninth setting information is realized by selecting the X-ray source arrangement switch 80*i* (the switch at a position corresponding to the arrangement of the second X-ray source 2*a*, which will serve as the main X-ray source) on the arrangement screen 8 during actual imaging by the operator.

As described above, each of the first setting information to the ninth setting information as the X-ray source arrangement information is realized by selecting corresponding one of the X-ray source arrangement switches 80 (80*a* to 80*i*) and selecting a position change switch 83 by the operator on the arrangement screen 8. If the position change switch 83 is selected, the first X-ray source 1*a* and the second X-ray source 2*a* are moved to positions corresponding to the target imaging angles selected.

Arrangement Screen

Figure 7:
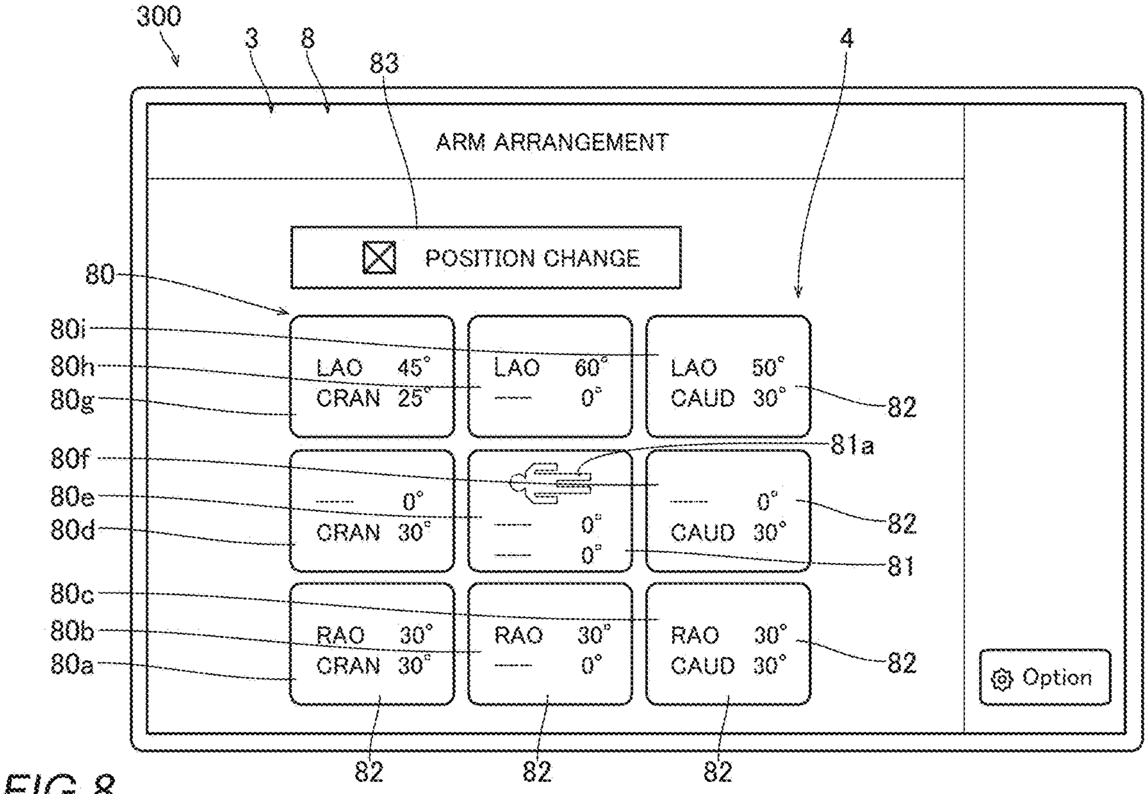
FIG. 7 is a view showing an arrangement screen of the touch panel of the X-ray imaging apparatus according to the embodiment illustrating a state before an imaging angle setting switch is operated.
Figure 8:
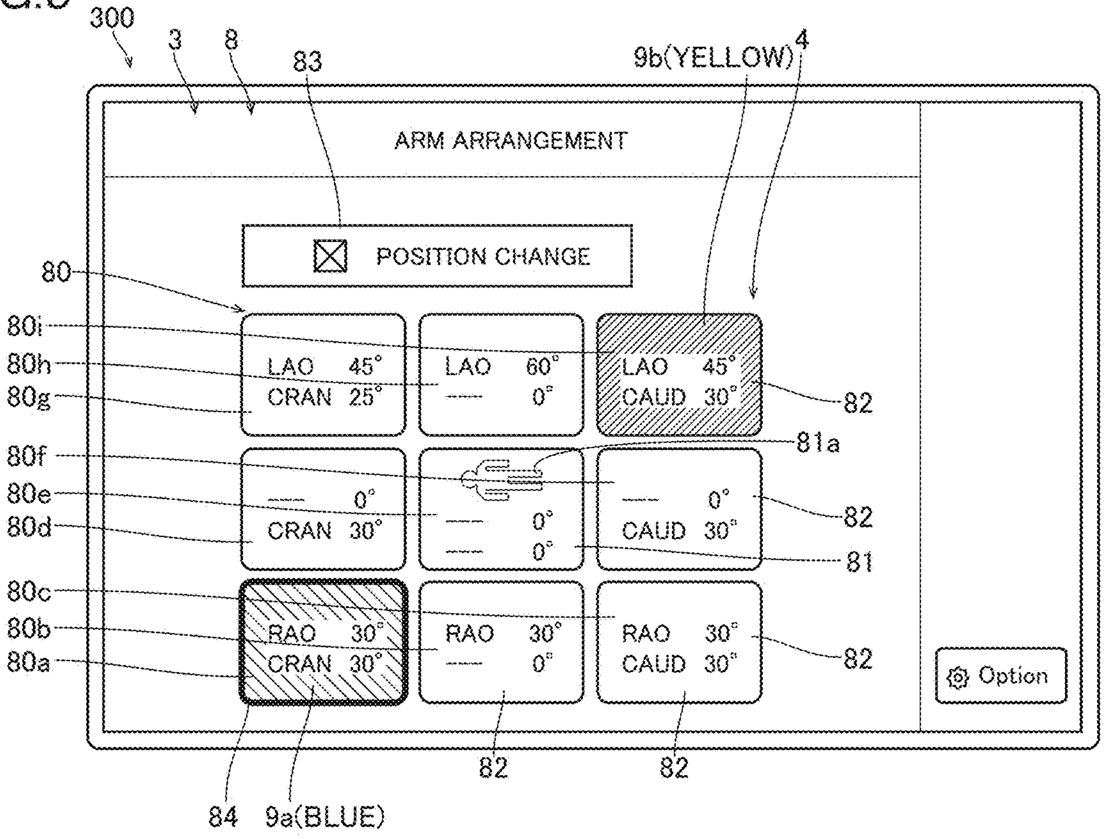
FIG. 8 is a view showing the arrangement screen of the touch panel of the X-ray imaging apparatus according to the embodiment illustrating a state after the imaging angle setting switch is operated.

As shown in FIGS. 7 and 8, the display 3 is configured to display the arrangement screen (arm arrangement screen) 8 indicating the arrangements corresponding to positions of both the first X-ray source 1*a* and the second X-ray source 2*a* at the target imaging angles with respect to an actual position of the subject 101. Accordingly, the operator can intuitively and roughly grasp the arrangements of the first X-ray sources 1*a* and the second X-ray sources 2*a* with respect to the subject 101 during imaging by seeing the arrangement screen 8.

The display 3 is configured to display a plurality of (nine) X-ray source arrangement switches (memory switches) 80 indicating positions at which the first X-ray source 1*a* and the second X-ray source 2*a* can be arranged with respect to the subject 101 on the arrangement screen 8 of the display 3 with the X-ray source arrangement switches being arranged in an array. The imaging angle specifier 4 includes the plurality of X-ray source arrangement switches 80.

Specifically, the plurality of X-ray source arrangement switches 80 include only one central subject section 81 to which an icon 81*a* representing the subject 101 who lies in the supine position is attached and two or more (eight) peripheral sections 82 arranged to surround the subject section 81 in the plan view. A cranial side of the icon 81*a* in the subject section 81 is oriented on a leftward side of the screen; a caudal side is oriented on a rightward side of the screen; a left arm side is oriented on an upward side of the screen; and a right arm side is oriented on a downward side of the screen. The plurality of X-ray source arrangement switches 80 are arranged in a 3×3 (three rows and three columns) cells (in a matrix shape).

The display 3 is configured to indicate a rightward/leftward-directional angle (an inclination angle in the rightward/leftward direction with respect to the vertical axis) and a body-axis-directional angle (an inclination angle in the body axis direction with respect to the vertical axis) with respect to the subject 101 as the target imaging angles. The rightward/leftward-directional angle is indicated in the section of each of the X-ray source arrangement switches 80 by using the aforementioned LAO/RAO. The body-axis-directional angle is indicated in the section of each of the X-ray source arrangement switches 80 by using the aforementioned CRAN/CAUD.

Configuration of Controller

Figure 4:
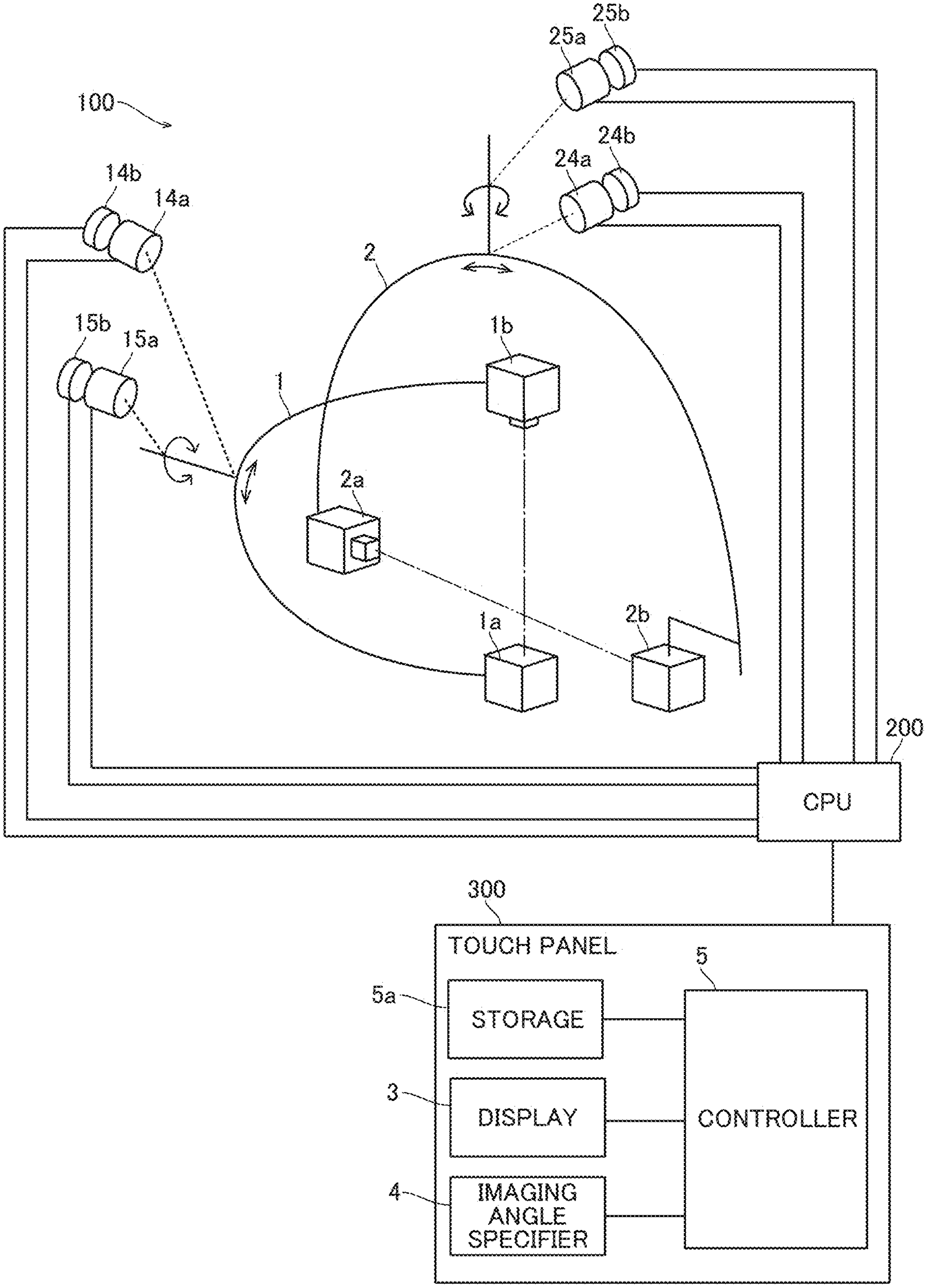
FIG. 4 is a block diagram illustrating the configuration of the X-ray imaging apparatus according to the embodiment.

The controller (display controller) 5 shown in FIG. 4 is configured to automatically select and display, if the arrangement of one of the first X-ray source 1*a* and the second X-ray source 2*a* is selected through the imaging angle specifier 4 (X-ray source arrangement switch 80) and is displayed on the arrangement screen 8 of the display 3, the arrangement of another of the first X-ray source 1*a* and the second X-ray source 2*a*.

Here, the controller 5 is configured to execute control for displaying a section frame line 84 that indicates the X-ray source arrangement switch 80 that represents the one of the first X-ray source 1*a* and the second X-ray source 2*a*, which is selected through the imaging angle specifier 4, and a section frame line 84 that indicates the X-ray source arrangement switch 80 that represents the another of the first X-ray source 1*a* and the second X-ray source 2*a* and is thicker than the section frame line that indicates the X-ray source arrangement switch that represents the one of the first X-ray source and the second X-ray source. That is, the section frame line 84 that indicates the X-ray source arrangement switch 80 corresponding to the arrangement of the main X-ray source is thicker than the section frame line 84 that indicates the X-ray source arrangement switch 80 corresponding to the arrangement of the sub X-ray source.

In a case in which the X-ray source arrangement information shown in FIG. 6 is stored in the storage 5*a*, the controller 5 sets the first X-ray source 1*a* of the frontal arm as the main X-ray source if any of the lower six X-ray source arrangement switches 80*a* to 80*f* is selected (pressed). In other words, the controller 5 makes the settings of the first X-ray source 1*a* to move the first X-ray source to the arrangement associated with the X-ray source arrangement switch 80 that is actually selected by the operator. In this case, the second X-ray source 2*a* is automatically set as the sub X-ray source.

Also, the controller 5 sets the second X-ray source 2*a* of the lateral arm as the main X-ray source if any of the upper three X-ray source arrangement switches 80*g* to 80*i* is selected (pressed). In other words, the controller 5 makes the settings of the second X-ray source 2*a* to move the second X-ray source to the arrangement associated with the X-ray source arrangement switch 80 that is actually selected by the operator. In this case, the first X-ray source 1*a* is automatically set as the sub X-ray source.

The controller 5 is configured to execute control for displaying both the arrangements of the first and second X-ray sources 1*a* and 2*a* selected in a discriminative form on the arrangement screen 8. Specifically, if any one of the plurality of X-ray source arrangement switches 80 is selected through the imaging angle specifier 4, the controller 5 is configured to execute control for displaying the X-ray source arrangement switch 80 that is associated with target imaging angles of the first X-ray source 1*a* and the X-ray source arrangement switch 80 that is associated with target imaging angles of the second X-ray source 2*a* on the display 3 in a form discriminative from the other X-ray source arrangement switches 80 at one time.

In the case in which the X-ray source arrangement information shown in FIG. 6 is stored in the storage 5*a*, if the operator selects the X-ray source arrangement switch 80*a* in the lower left part of the screen (on the right side and the cranial side of the subject 101) on the arrangement screen 8, the controller 5 automatically selects the X-ray source arrangement switch 80*i* in the upper right part of the screen and displays the X-ray source arrangement switches 80*a* and 80*i* on the display 3 in the form discriminative from the other X-ray source arrangement switches 80 at one time in a particular example.

In other words, the controller 5 is configured to change a display color of the X-ray source arrangement switch 80 that is to indicate the position of the first X-ray source 1*a* selected to a first discriminative color 9*a* (blue), and to change a display color of the X-ray source arrangement switch 80 that is to indicate the position of the second X-ray source 2*a* selected to a second discriminative color 9*b* (yellow) different from the first discriminative color 9*a*.

In this case, the controller 5 is configured to display the X-ray source arrangement switch 80 that is associated with the target imaging angle of the first X-ray source 1*a* in the first discriminative color 9*a* (yellow), which is the same color as the first exterior color 6*a* (yellow) of the first arm 1, and to display the X-ray source arrangement switch 80 that is associated with the target imaging angle of the second X-ray source 2*a* in the second discriminative color 9*b* (blue), which is the same color as the second exterior color 6*b* (blue) of the second arm 2.

Also, the controller 5 is configured to execute control for indicating the rightward/leftward-directional angle and the body-axis-directional angle with respect to the subject 101 as the target imaging angles inside the section frame line 84 of each of the plurality of X-ray source arrangement switches 80.

Here, the controller 5 is configured to indicate the target imaging angles (the rightward/leftward-directional angle and the body-axis-directional angle with respect to the subject 101) of the one of the first X-ray sources 1*a* and the second X-ray sources 2*a* inside the section frame line 84 of each of the plurality of X-ray source arrangement switches 80 prior to the selection of the any one of the plurality of X-ray source arrangement switches 80 through the imaging angle specifier 4. That is, the controller 5 is configured to execute control for indicating the target imaging angles of the main X-ray source inside the section frame line 84 of each of the plurality of X-ray source arrangement switches 80. At this time, no target imaging angles of the sub X-ray source are displayed inside the section frame line 84.

Also, the controller 5 is configured to automatically select and display one of the plurality of X-ray source arrangement switches 80 as the X-ray source arrangement switch 80 in which the another of the first X-ray source 1*a* and the second X-ray source 2*a* is arranged based on the X-ray source arrangement information (see FIG. 6) if the any one of the plurality of X-ray source arrangement switches 80 is selected through the imaging angle specifier 4 and is displayed and to replace the target imaging angles that are indicated inside the section frame line 84 of the X-ray source arrangement switch 80 that is automatically selected and is displayed with the target imaging angles of the another of the first X-ray source 1*a* and the second X-ray source 2*a*.

In a particular example, in the case in which the X-ray source arrangement information shown in FIG. 6 is stored in the storage 5*a*, if the operator selects the X-ray source arrangement switch 80*a* in the lower left part of the screen (on the right side and the cranial side of the subject 101), the controller 5 automatically selects and displays the X-ray source arrangement switch 80*i* in the upper right part of the screen. In this case, the X-ray source arrangement switch 80*a* indicates the arrangement of the first X-ray source 1*a*, which will serve as the main X-ray source, with respect to the subject 101, and the X-ray source arrangement switch 80*i* indicates the arrangement of the second X-ray source 2*a*, which will serve as the sub X-ray source, with respect to the subject 101. At this time, the controller 5 replaces the target imaging angles indicated in the section frame line 84 of the X-ray source arrangement switch 80*i* from "LAO 50 degrees and CAUD 30 degrees (see FIG. 7)" to "LAO 45 degrees and CAUD 30 degrees (see FIG. 8)" based on the X-ray source arrangement information.

Here, the controller 5 is configured to control irradiation of the subject with X-rays to emit the X-rays from the front side or the back side of the subject 101 in the plan view if the subject section 81 arranged in a central part is selected by the operator, and to emit the X-rays from a peripheral side of the subject 101 in the plan view if one of the peripheral sections 82 is selected by the operator.

Control Processing Flow for Moving X-Ray Sources Executed by Controller

Figure 9:
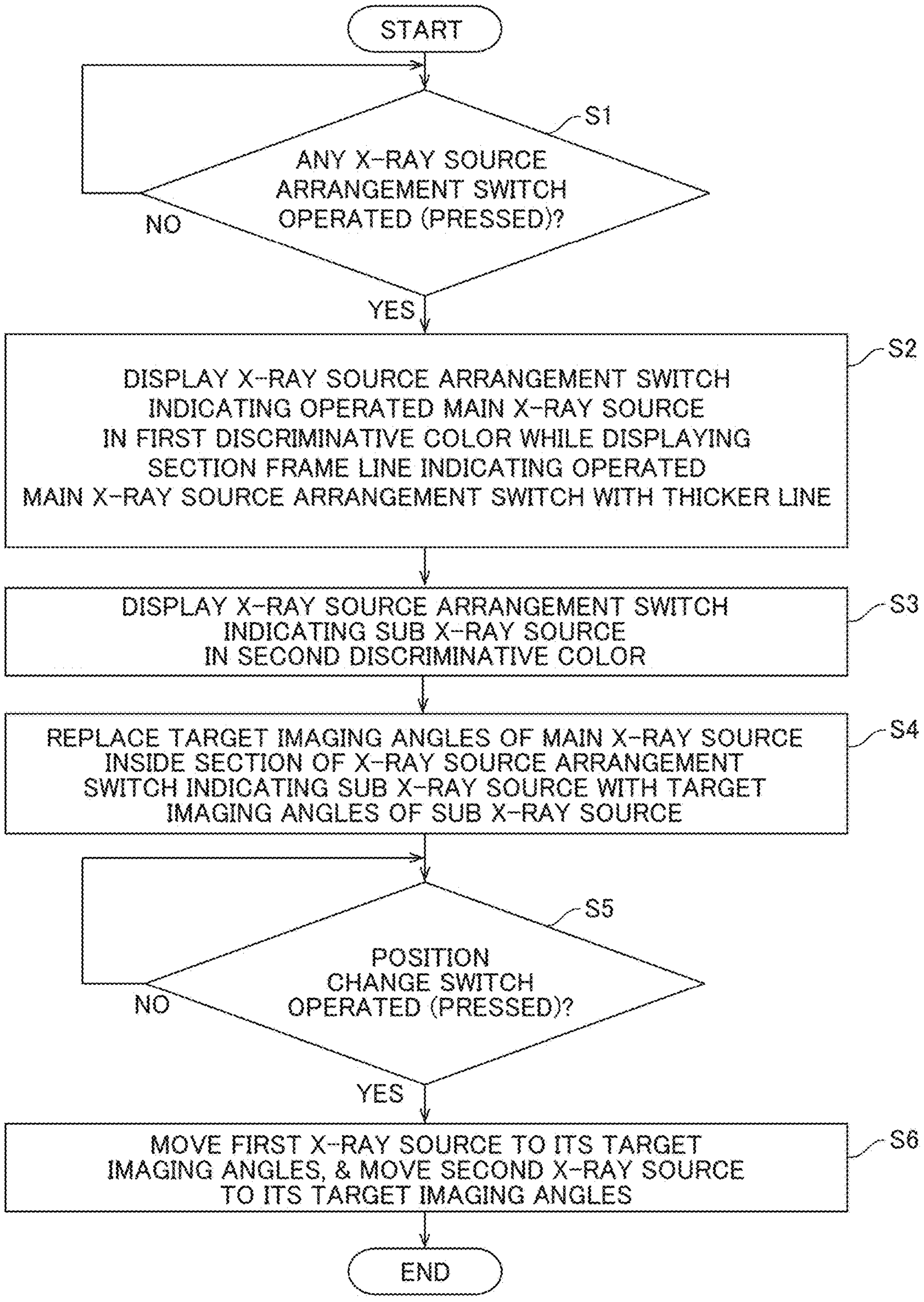
FIG. 9 is a control processing flow for moving the X-ray sources executed by a controller (display controller) of the X-ray imaging apparatus according to the embodiment.

The following description describes a control processing flow for moving the X-ray sources executed by the controller (display controller) 5 with reference to FIG. 9. Here, the control processing flow is described by considering an initial state in which a predetermined input operation for displaying the arrangement screen 8 on the display 3 (touch panel 300) is input as start.

Here, the plurality of X-ray source arrangement switches 80 in a 3×3 matrix form are indicated on the arrangement screen 8 in the initial state. Also, in the initial state, the target imaging angles of the main X-ray source are indicated inside the section of each of the plurality of X-ray source arrangement switches 80.

First, in step S1, it is determined whether any of the plurality of X-ray source arrangement switches 80 is operated (pressed). If any of the plurality of X-ray source arrangement switches 80 is operated, the procedure goes to step S2.

In step S2, the X-ray source arrangement switch 80 that indicates the main X-ray source operated is indicated in the first discriminative color 9*a* (in the form discriminative from the other X-ray source arrangement switches 80). In this indication, the section frame line 84 of the X-ray source arrangement switch 80 is indicated with a thicker line. An exemplary indication shown in FIG. 8 shows a case in which the X-ray source arrangement switch 80*a* on the right side and cranial side of the subject 101 is operated. Subsequently, the procedure goes to step S3.

In step S3, the X-ray source arrangement switch 80 that indicates the sub X-ray source is indicated in the second discriminative color 9*b* (in the form discriminative from the other X-ray source arrangement switches 80) based on the X-ray arrangement information stored in the storage 5*a* (see FIG. 6). The exemplary indication shown in FIG. 8 shows a case in which the X-ray source arrangement switch 80*i* on the left side and the caudal side of the subject 101 is automatically selected and displayed. Subsequently, the procedure goes to step S4.

In step S4, the target imaging angles of the main X-ray source that are displayed inside the section of the X-ray source arrangement switch 80 that is to indicate the sub X-ray source is replaced with the target imaging angles of the sub X-ray source. That is, the angles shown in FIG. 7 are changed to the angles shown in FIG. 8. Subsequently, the procedure goes to step S5.

In step S5, it is determined whether the position change switch 83 is operated (pressed). If the position change switch 83 is operated, the procedure goes to step S6.

In step S6, the first X-ray source 1*a* is moved to its target imaging angles, the second X-ray source 2*a* is moved to its target imaging angles.

In a particular example, if the X-ray source arrangement switch 80*a* is operated in step S1, the first X-ray source 1*a*, which will serve as the main X-ray source, is moved to the target imaging angles of RAO 30 degrees and CRAN 30 degrees (on the right side and the cranial side of the subject 101). Also, the second X-ray source 2*a*, which will serve as the sub X-ray source, is moved to the target imaging angles of LAO 45 degrees and CAUD 30 degrees (on the left side and the caudal side of the subject 101). After that, the control processing flow for moving the X-ray source executed by the controller 5 ends.

Advantages of the Embodiment

In this embodiment, the following advantages are obtained.

In this embodiment, as described above, the display 3 is configured to display the arrangement screen 8 indicating the arrangements corresponding to positions of both the first X-ray source 1*a* and the second X-ray source 2*a* at their target imaging angles with respect to an actual position of the subject 101. Accordingly, operators can understand the positions of both the first X-ray source 1*a* and the second X-ray source 2*a* with respect to the subject 101 based on an image like a map allowing the operators to visually confirm the positions on the arrangement screen 8. Also, the imaging angle specifier 4 and the display 3 are arranged in the common arrangement area 103 of the X-ray imaging apparatus main body 100*a*. Accordingly, the operators can confirm both the imaging angle specifier 4 and the display 3 without moving their lines of sight. Consequently, the operators can operate the X-ray imaging apparatus to move the first X-ray source 1*a* and the second X-ray source 2*a* without moving their lines of sight and can intuitively operate the X-ray imaging apparatus to move the first X-ray source 1*a* and the second X-ray source 2*a*.

Also, in this embodiment, as described above, the imaging angle specifier 4 and the display 3 are integrally configured as the touch panel 300. Accordingly, it is possible to simplify a device configuration for displaying and operating (setting) the first X-ray sources 1*a* and the second X-ray sources 2*a* to move the first X-ray source and the second X-ray source by using the touch panel 300.

Also, in this embodiment, as described above, the controller 5 that automatically selects and displays, if the arrangement of one of the first X-ray source 1*a* and the second X-ray source 2*a* is selected through the imaging angle specifier 4 and is displayed on the arrangement screen 8 of the display 3, the arrangement of another of the first X-ray source 1*a* and the second X-ray source 2*a* is further provided. Accordingly, it is possible to reduce a burden of operation since operators do not necessarily select the arrangement of the another of the first X-ray source 1*a* and the second X-ray source 2*a*.

Also, in this embodiment, as described above, the controller 5 is configured to execute control for displaying both the arrangements of the first and second X-ray sources 1*a* and 2*a* selected in a discriminative form on the arrangement screen 8. Accordingly, operators can easily visually discriminate the arrangements of the first and second X-ray sources 1*a* and 2*a* selected on the arrangement screen 8. Consequently, the operators can more intuitively operate the X-ray imaging apparatus to move the first X-ray source 1*a* and the second X-ray source 2*a*.

Also, in this embodiment, as described above, the display 3 is configured to display the plurality of X-ray source arrangement switches 80 (80*a* to 80*i*) indicating positions at which the first X-ray source 1*a* and the second X-ray source 2*a* can be arranged with respect to the subject 101 on the arrangement screen 8 of the display 3 with the X-ray source arrangement switches being arranged in an array; and if any one of the plurality of X-ray source arrangement switches 80 is selected through the imaging angle specifier 4, the controller 5 is configured to execute control for displaying the X-ray source arrangement switch 80 that is associated with target imaging angles of the first X-ray source 1*a* and the X-ray source arrangement switch 80 that is associated with target imaging angles of the second X-ray source 2*a* on the display 3 in a form discriminative from the other X-ray source arrangement switches 80 at one time. Accordingly, operators can easily visually discriminate the switch in which the first X-ray source 1*a* is arranged, the switch in which the second X-ray source 2*a* is arranged, and the other switches in the plurality of X-ray source arrangement switches 80.

Also, in this embodiment, as described above, the controller 5 is configured to change a display color of the X-ray source arrangement switch 80 that is to indicate the position of the first X-ray source 1*a* selected to a first discriminative color 9*a*, and to change a display color of the X-ray source arrangement switch 80 that is to indicate the position of the second X-ray source 2*a* selected to a second discriminative color 9*b* different from the first discriminative color 9*a*. Accordingly, the displaying form for changing display colors allows operators to easily recognize positions at which the first and second X-ray sources 1*a* and 2*a* selected are to be arranged.

Also, in this embodiment, as described above, the first arm 1 is colored in a first exterior color 6*a*; the second arm 2 is colored in a second exterior color 6*b* different from the first exterior color 6*a*; and the controller 5 is configured to display the X-ray source arrangement switch 80 that is associated with the target imaging angles of the first X-ray source 1*a* in the first discriminative color 9*a*, which is the same color as the first exterior color 6*a* of the first arm 1, and to display the X-ray source arrangement switch 80 that is associated with the target imaging angles of the second X-ray source 2*a* in the second discriminative color 9*b*, which is the same color as the second exterior color 6*b* of the second arm 2. Accordingly, the first X-ray sources 1*a* and the second X-ray sources 2*a*, which are arranged around the subject 101 can be associated with the X-ray source arrangement switches 80 corresponding to the first X-ray sources 1*a* and the second X-ray sources 2*a*, respectively, by the first discriminative color 9*a* and the second discriminative color 9*b*. Consequently, operators can more easily recognize the positions at which the first and second X-ray sources 1*a* and 2*a* selected are to be arranged.

Also, in this embodiment, as described above, the controller 5 is configured to execute control for displaying a section frame line 84 that indicates the X-ray source arrangement switch 80 that represents the one of the first X-ray source 1*a* and the second X-ray source 2*a*, which is selected through the imaging angle specifier 4, and a section frame line 84 that indicates the X-ray source arrangement switch 80 that represents the another of the first X-ray source 1*a* and the second X-ray source 2*a* and is thicker than the section frame line that indicates the X-ray source arrangement switch that represents the one of the first X-ray source and the second X-ray source. Accordingly, operators can easily visually discriminate the section frame line 84 that indicates the X-ray source arrangement switch 80 that represents the one of the first X-ray source 1*a* and the second X-ray source 2*a*, which is selected through the imaging angle specifier 4 by themselves, and the section frame line 84 that indicates the X-ray source arrangement switch 80 that represents the another of the first X-ray source 1*a* and the second X-ray source 2*a* from each other.

Also, in this embodiment, as described above, the storage 5*a* for storing X-ray source arrangement information associated with the arrangements of the first X-ray source 1*a* and the second X-ray source 2*a* with respect to each other is further provided; and the controller 5 is configured to indicate the target imaging angles of the one of the first X-ray sources 1*a* and the second X-ray sources 2*a* inside the section frame line 84 of each of the plurality of X-ray source arrangement switches 80 prior to the selection of the any one of the plurality of X-ray source arrangement switches 80 through the imaging angle specifier 4, and to automatically select and display one of the plurality of X-ray source arrangement switches 80 as the X-ray source arrangement switch 80 in which the another of the first X-ray source 1*a* and the second X-ray source 2*a* is arranged based on the X-ray source arrangement information if the any one of the plurality of X-ray source arrangement switches 80 is selected through the imaging angle specifier 4 and is displayed and to replace the target imaging angles that are indicated inside the section frame line 84 of the X-ray source arrangement switch 80 that is automatically selected and is displayed with the target imaging angles of the another of the first X-ray source 1*a* and the second X-ray source 2*a*. Accordingly, since the target imaging angles indicated inside the section frame line 84 of the X-ray source arrangement switch 80 that is automatically selected and displayed can be replaced with the target imaging angles of the another of the first X-ray source 1*a* and the second X-ray source 2*a*, it is possible to reduce a burden of rearrangement with the target imaging angles of the another of the first X-ray source 1*a* and the second X-ray source 2*a*. In addition, operators can easily recognize the target imaging angles of the another of the first X-ray source 1*a* and the second X-ray source 2*a*.

Also, in this embodiment, as described above, the plurality of X-ray source arrangement switches 80 include one central subject section 81 to which the icon 81*a* representing the subject 101 is attached and two or more peripheral sections 82 arranged to surround the subject section 81; and the controller 5 is configured to control irradiation of the subject with X-rays to emit the X-rays from a front side or a back side of the subject 101 in a plan view if the subject section 81 is selected, and to emit the X-rays from a peripheral side of the subject 101 in the plan view if one of the peripheral sections 82 is selected. Accordingly, operators can easily grasp association of each of the X-ray source arrangement switches 80 with a posture and an orientation of the subject 101.

Also, in this embodiment, as described above, the display 3 is configured to indicate a rightward/leftward-directional angle and a body-axis-directional angle with respect to the subject 101 as the target imaging angle; and the controller 5 is configured to execute control for indicating the rightward/leftward-directional angle and the body-axis-directional angle with respect to the subject 101 as the target imaging angles inside the section frame line 84 of each of the plurality of X-ray source arrangement switches 80. Accordingly, since the rightward/leftward-directional angle and the body-axis-directional angle can be separately indicated, operators can easily grasp the arrangements of the X-ray source relative to the subject 101.

Also, in this embodiment, as described above, the display 3 is configured to be able to display a pre-arrangement setting screen 7 for setting association of the arrangements of the first X-ray source 1*a* and the second X-ray source 2*a* with each other and setting the target imaging angles of the first X-ray source 1*a* and the second X-ray source 2*a*, and the arrangement screen 8 based on information that is set in the pre-arrangement setting screen 7. Accordingly, the pre-arrangement setting screen 7 and the arrangement screen 8 allow operators to easily operate the screens to set the target imaging angles of the first X-ray sources 1*a* and the second X-ray sources 2*a* and to set the arrangements of the first X-ray sources 1*a* and the second X-ray sources 2*a*.

Modified Embodiments

Note that the embodiment disclosed this time must be considered as illustrative in all points and not restrictive. The scope of the present invention is not shown by the above description of the embodiments but by the scope of claims for patent, and all modifications (modified embodiments) within the meaning and scope equivalent to the scope of claims for patent are further included.

That is, while the X-ray imaging apparatus is a general X-ray imaging apparatus installed in an X-ray imaging room has been shown in the aforementioned embodiment, the present invention is not limited to this. For example, the X-ray imaging apparatus may be an X-ray imaging apparatus for hospital rounds.

Also, while the example in which the X-ray imaging apparatus includes a C-shaped arm has been shown in the aforementioned embodiment, the present invention is not limited to this. In the present invention, the X-ray imaging apparatus may include an L-shaped arm or the like.

Also, while the example in which the display and the imaging angle specifier are integrally configured (configured as a touch panel) has been shown in the aforementioned embodiment, the present invention is not limited to this. In the present invention, the display and the imaging angle specifier may be separately configured from each other.

Also, while the example in which the X-ray source arrangement switches are arranged in a 3×3 matrix shape has been shown in the aforementioned embodiment, the present invention is not limited to this. In the present invention, the X-ray source arrangement switches may be arranged in a 5×5 matrix shape or the like.

Also, while the example in which an arrangement of the second X-ray source arrangement is automatically selected from a plurality of X-ray source arrangement switches when an operator selects an arrangement of the first X-ray source from the plurality of X-ray source arrangement switches has been shown in the aforementioned embodiment, the present invention is not limited to this. In the present invention, the arrangements of both the first X-ray source and the second X-ray source may be configured to be selected by the operator from the plurality of X-ray source arrangement switches.

Also, while the example in which the first exterior color and the first discriminative color are blue has been shown in the aforementioned embodiment, the present invention is not limited to this. In the present invention, the first exterior color and the first discriminative color may be another color other than blue as long as they are different from the second exterior color and the second discriminative color.

Also, while the example in which the second exterior color and the second discriminative color are yellow has been shown in the aforementioned embodiment, the present invention is not limited to this. In the present invention, the second exterior color and the second discriminative color may be another color other than yellow as long as they are different from the first exterior color and the first discriminative color.

It is understood by those skilled in the art that the exemplary embodiments described above are specific examples of the following aspects.

Modes (Mode Item 1)

An X-ray imaging apparatus includes a first arm supporting a first X-ray source and a first X-ray detector facing each other; a second arm supporting a second X-ray source and a second X-ray detector facing each other; an imaging angle specifier for setting a target imaging angle(s) of the first X-ray source and a target imaging angle(s) of the second X-ray source; and a display for displaying details set by the imaging angle specifier, wherein the display is configured to display an arrangement screen representing arrangements corresponding to positions of both the first X-ray source and the second X-ray source at the target imaging angles with respect to an actual position of a subject, and the imaging angle specifier and the display are arranged in a common arrangement area of an X-ray imaging apparatus main body.

(Mode Item 2)

In the X-ray imaging apparatus according to mode item 1, the imaging angle specifier and the display are integrally configured as a touch panel.

(Mode Item 3)

In the X-ray imaging apparatus according to mode item 1, a controller for executing control for automatically selecting and displaying, if the arrangement of one of the first X-ray source and the second X-ray source is selected through the imaging angle specifier and is displayed on the arrangement screen of the display, the arrangement of another of the first X-ray source and the second X-ray source is further provided.

(Mode Item 4)

In the X-ray imaging apparatus according to mode item 3, the controller is configured to execute control for displaying the arrangements of both the first and second X-ray sources selected in a form discriminative from each other on the arrangement screen.

(Mode Item 5)

In the X-ray imaging apparatus according to mode item 4, the display is configured to display a plurality of X-ray source arrangement sections indicating positions at which the first X-ray source and the second X-ray source be able to be arranged with respect to the subject on the arrangement screen of the display with the X-ray source arrangement sections being arranged in an array; and the controller is configured to execute, if any one of the plurality of X-ray source arrangement sections is selected through the imaging angle specifier, control for displaying the X-ray source arrangement section that is associated with the target imaging angle(s) of the first X-ray source and the X-ray source arrangement section that is associated with the target imaging angle(s) of the second X-ray source on the display in a form discriminative from the other X-ray source arrangement sections at one time.

(Mode Item 6)

In the X-ray imaging apparatus according to mode item 5, the controller is configured to execute control for changing a display color of the X-ray source arrangement section that is to indicate the position of the first X-ray source selected to a first discriminative color, and control for changing a display color of the X-ray source arrangement section that is to indicate the position of the second X-ray source selected to a second discriminative color different from the first discriminative color.

(Mode Item 7)

In the X-ray imaging apparatus according to mode item 6, the first arm is colored in a first exterior color; the second arm is colored in a second exterior color different from the first exterior color; and the controller is configured to execute control for displaying the X-ray source arrangement section that is associated with the target imaging angle(s) of the first X-ray source in the first discriminative color, which is the same color as the first exterior color of the first arm, and control for displaying the X-ray source arrangement section that is associated with the target imaging angle(s) of the second X-ray source in the second discriminative color, which is the same color as the second exterior color of the second arm.

(Mode Item 8)

In the X-ray imaging apparatus according to mode item 5, the controller is configured to execute control for displaying a section frame line that indicates the X-ray source arrangement section that represents the one of the first X-ray source and the second X-ray source, which is selected through the imaging angle specifier, and a section frame line that indicates the X-ray source arrangement section that represents the another of the first X-ray source and the second X-ray source and is thicker than the section frame line that indicates the X-ray source arrangement section that represents the one of the first X-ray source and the second X-ray source.

(Mode Item 9)

In the X-ray imaging apparatus according to mode item 5, a storage for storing X-ray source arrangement information associated with the arrangements of the first X-ray source and the second X-ray source with respect to each other is further provided; and the controller is configured to execute control for indicating the target imaging angle(s) of the one of the first X-ray source and the second X-ray source inside the section frame line of each of the plurality of X-ray source arrangement sections prior to the selection of the any one of the plurality of X-ray source arrangement sections through the imaging angle specifier, and control for automatically selecting and displaying, if the any one of the plurality of X-ray source arrangement sections is selected through the imaging angle specifier and is displayed, another of the plurality of X-ray source arrangement sections as the X-ray source arrangement section in which the another of the first X-ray source and the second X-ray source is arranged based on the X-ray source arrangement information and for replacing the target imaging angle(s) that is/are indicated inside the section frame line of the X-ray source arrangement section that is automatically selected and is displayed with the target imaging angle(s) of the another of the first X-ray source and the second X-ray source.

(Mode Item 10)

In the X-ray imaging apparatus according to mode item 5, the plurality of X-ray source arrangement sections include one subject section to which an icon representing the subject is attached and two or more peripheral sections arranged to surround the subject section; and the controller is configured to control irradiation of the subject with X-rays to emit the X-rays from a front side or a back side of the subject in a plan view if the subject section is selected, and to emit the X-rays from a peripheral side of the subject in the plan view if one of the peripheral sections is selected.

(Mode Item 11)

In the X-ray imaging apparatus according to mode item 5, the display is configured to indicate a rightward/leftward-directional angle and a body-axis-directional angle with respect to the subject as the target imaging angles; and the controller is configured to execute control for indicating the rightward/leftward-directional angle and the body-axis-directional angle with respect to the subject as the target imaging angles inside the section frame line of each of the plurality of X-ray source arrangement sections.

(Mode Item 12)

In the X-ray imaging apparatus according to mode item 1, the display is configured to be able to display a pre-arrangement setting screen for setting association of the arrangements of the first X-ray source and the second X-ray source with each other, and for setting the target imaging angles of the first X-ray source and the second X-ray source, and the arrangement screen based on information that is set in the pre-arrangement setting screen.

DESCRIPTION OF REFERENCE NUMERALS

1; first arm
1*a*; first X-ray source
1*b*; first X-ray detector
2; second arm
2*a*; second X-ray source
2*b*; second X-ray detector
3; display
4; imaging angle specifier
5; controller
5*a*; storage
6*a*; first exterior color
6*b*; second exterior color
7; pre-arrangement setting screen
8; arrangement screen
9*a*; first discriminative color
9*b*; second discriminative color
80, 80*a*-80*i*; X-ray source arrangement switch (X-ray source arrangement section)
81; subject section
81*a*; icon
82; peripheral section
84; section frame line
100; X-ray imaging apparatus
100*a*; X-ray imaging apparatus main body
101; subject
103; arrangement area
300; touch panel

The invention claimed is:

1. An X-ray imaging apparatus comprising:

a first arm supporting a first X-ray source and a first X-ray detector facing each other;

a second arm supporting a second X-ray source and a second X-ray detector facing each other;

an imaging angle specifier for setting a target imaging angle(s) of the first X-ray source and a target imaging angle(s) of the second X-ray source; and a display for displaying an arrangement screen including a plurality of X-ray source arrangement sections indicating positions at which the first X-ray source and the second X-ray source be able to be arranged with respect to a subject; and a controller for executing, if any one of the plurality of X-ray source arrangement sections is selected, control for displaying the X-ray source arrangement section that is associated with the target imaging angle(s) of the first X-ray source and the X-ray source arrangement section that is associated with the target imaging angle(s) of the second X-ray source on the display in a form discriminative from the other X-ray source arrangement sections at one time.

2. The X-ray imaging apparatus according to claim 1, wherein the imaging angle specifier and the display are integrally configured as a touch panel.

3. The X-ray imaging apparatus according to claim 1, wherein the controller executes control for automatically selecting and displaying, if the arrangement of one of the first X-ray source and the second X-ray source is selected through the imaging angle specifier and is displayed on the arrangement screen of the display, the arrangement of another of the first X-ray source and the second X-ray source.

4. The X-ray imaging apparatus according to claim 3, wherein the controller is configured to execute control for displaying the arrangements of both the first and second X-ray sources selected in a form discriminative from each other on the arrangement screen.

5. The X-ray imaging apparatus according to claim 1, wherein the controller is configured to execute control for changing a display color of the X-ray source arrangement section that is to indicate the position of the first X-ray source selected to a first discriminative color, and control for changing a display color of the X-ray source arrangement section that is to indicate the position of the second X-ray source selected to a second discriminative color different from the first discriminative color.

6. The X-ray imaging apparatus according to claim 5, wherein the first arm is colored in a first exterior color;

the second arm is colored in a second exterior color different from the first exterior color; and the controller is configured to execute control for displaying the X-ray source arrangement section that is associated with the target imaging angle(s) of the first X-ray source in the first discriminative color, which is the same color as the first exterior color of the first arm, and control for displaying the X-ray source arrangement section that is associated with the target imaging angle(s) of the second X-ray source in the second discriminative color, which is the same color as the second exterior color of the second arm.

7. The X-ray imaging apparatus according to claim 1, wherein the controller is configured to execute control for displaying a section frame line that indicates the X-ray source arrangement section that represents the one of the first X-ray source and the second X-ray source, which is selected through the imaging angle specifier, and a section frame line that indicates the X-ray source arrangement section that represents the another of the first X-ray source and the second X-ray source and is thicker than the section frame line that indicates the X-ray source arrangement section that represents the one of the first X-ray source and the second X-ray source.

8. The X-ray imaging apparatus according to claim 1, further comprising a storage for storing X-ray source arrangement information associated with the arrangements of the first X-ray source and the second X-ray source with respect to each other, wherein the controller is configured to execute control for indicating the target imaging angle(s) of the one of the first X-ray source and the second X-ray source inside the section frame line of each of the plurality of X-ray source arrangement sections prior to the selection of the any one of the plurality of X-ray source arrangement sections through the imaging angle specifier, and control for automatically selecting and displaying, if the any one of the plurality of X-ray source arrangement sections is selected through the imaging angle specifier and is displayed, another of the plurality of X-ray source arrangement sections as the X-ray source arrangement section in which the another of the first X-ray source and the second X-ray source is arranged based on the X-ray source arrangement information and for replacing the target imaging angle(s) that is/are indicated inside the section frame line of the X-ray source arrangement section that is automatically selected and is displayed with the target imaging angle(s) of the another of the first X-ray source and the second X-ray source.

9. The X-ray imaging apparatus according to claim 1, wherein the plurality of X-ray source arrangement sections include one subject section to which an icon representing the subject is attached and two or more peripheral sections arranged to surround the subject section; and the controller is configured to control irradiation of the subject with X rays to emit the X rays from a front side or a back side of the subject in a plan view if the subject section is selected, and to emit the X-rays from a peripheral side of the subject in the plan view if one of the peripheral sections is selected.

10. The X-ray imaging apparatus according to claim 1, wherein the display is configured to indicate a rightward/leftward-directional angle and a body-axis-directional angle with respect to the subject as the target imaging angles; and the controller is configured to execute control for indicating the rightward/leftward-directional angle and the body-axis-directional angle with respect to the subject as the target imaging angles inside the section frame line of each of the plurality of X-ray source arrangement sections.

11. The X-ray imaging apparatus according to claim 1, wherein the display is configured to be able to display a pre-arrangement setting screen for setting association of the arrangements of the first X-ray source and the second X-ray source with each other, and for setting the target imaging angles of the first X-ray source and the second X-ray source, and the arrangement screen based on information that is set in the pre-arrangement setting screen.

12. The X-ray imaging apparatus according to claim 1, wherein the imaging angle specifier and the display are arranged in a common arrangement area of an X-ray imaging apparatus main body.

* * * * *